(12) United States Patent
Gerlof et al.

(10) Patent No.: US 9,371,214 B2
(45) Date of Patent: Jun. 21, 2016

(54) LOCKING DEVICE
(71) Applicant: Putzmeister Engineering GmbH, Aichtal (DE)
(72) Inventors: Torben Gerlof, Altdorf (DE); Oliver Jaumann, Aidlingen (DE); Gernot Goeggelmann, Nuertingen (DE); Martin Diebold, Reutlingen (DE)
(73) Assignee: Putzmeister Engineering GmbH, Aichtal (DE)
( * ) Notice: Subject to any disclaimer, the term of this patent is extended or adjusted under 35 U.S.C. 154(b) by 0 days.
(21) Appl. No.: 14/402,399
(22) PCT Filed: Aug. 21, 2013
(86) PCT No.: PCT/EP2013/067370
§ 371 (c)(1),
(2) Date: Nov. 20, 2014
(87) PCT Pub. No.: WO2014/033024
PCT Pub. Date: Mar. 6, 2014
(65) Prior Publication Data
US 2015/0110544 A1 Apr. 23, 2015
(30) Foreign Application Priority Data
Aug. 31, 2012 (DE) .......................... 10 2012 215 534
(51) Int. Cl.
*B66C 23/78* (2006.01)
*B60S 9/02* (2006.01)
(52) U.S. Cl.
CPC . *B66C 23/78* (2013.01); *B60S 9/02* (2013.01); *Y10T 403/32426* (2015.01)
(58) Field of Classification Search
None
See application file for complete search history.
(56) References Cited
U.S. PATENT DOCUMENTS
3,279,622 A 10/1966 Person
4,394,913 A 7/1983 Lanning et al.
(Continued)

FOREIGN PATENT DOCUMENTS
DE 31 43 782 A1 6/1982
DE 42 11 493 A1 10/1993
(Continued)

OTHER PUBLICATIONS
International Search Report of PCT/EP2013/067370, mailed Nov. 22, 2013.
(Continued)

*Primary Examiner* — Victor MacArthur
(74) *Attorney, Agent, or Firm* — Collard & Roe, P.C.

(57) ABSTRACT

A locking device for supporting members for a mobile machine, which supporting members are arranged on a chassis or load-bearing frame and can be extended, pivoted or telescoped from a retracted transport position into a deployed working position, has a locking bolt which can be displaced between a locked position and an unlocked position in a guide sleeve which is fixed to the frame and is arranged transversely with respect to the pulling-out direction of the supporting member, which locking bolt is prestressed in the direction of the locked position under the action of a spring, has an actuating member which displaces the locking bolt between the locked position and the unlocked position, and has a latching and guiding member for the locking bolt, which latching and guiding member is arranged rigidly on the supporting member, wherein the latching and guiding member has a guiding curve which pushes the locking bolt into a release slope, and wherein the locking bolt can be moved in the release slope automatically into the locked position thereof. In order for it to be possible to perform arresting of the supporting members in defined positions in the case of limited spatial conditions and only partially extended supporting members, the latching and guiding member extends between a first latching position for the locking bolt in the region of the retracted transport position of the supporting member and a second latching position for the locking bolt in the region of the completely extended, pivoted-out or telescoped working position of the supporting member, and the latching and guiding member has at least one further latching position between the first and second latching position.

6 Claims, 10 Drawing Sheets

(56) References Cited

U.S. PATENT DOCUMENTS

| | | | |
|---|---|---|---|
| 5,470,167 A | 11/1995 | Benckert et al. | |
| 7,552,828 B2 * | 6/2009 | Fugel | B66C 23/78 212/302 |
| 7,654,767 B2 | 2/2010 | Sieberer | |
| 7,909,059 B2 | 3/2011 | Wehner et al. | |
| 2001/0050476 A1 * | 12/2001 | Lagsdin | E02F 9/085 280/763.1 |
| 2004/0175228 A1 * | 9/2004 | Sieberer | B60P 1/54 403/322.4 |

FOREIGN PATENT DOCUMENTS

| | | |
|---|---|---|
| DE | 195 19 810 A1 | 12/1996 |
| DE | 691 11 808 T2 | 12/1996 |
| DE | 201 20 964 U1 | 6/2003 |
| EP | 0 357 988 A | 3/1990 |
| EP | 1 454 872 A1 | 9/2004 |
| EP | 2 038 493 B1 | 3/2009 |
| JP | S56 119755 U | 9/1981 |
| JP | S60 130287 U | 8/1985 |
| JP | H05 64026 U | 8/1993 |
| WO | 91/17065 A1 | 11/1991 |
| WO | WO 02072409 A1 * | 9/2002 |

OTHER PUBLICATIONS

German Search Report in 10 2012 215 534.1, dated Jul. 31, 2013, with English translation of relevant parts.

* cited by examiner

LOCKING DEVICE

The invention relates to a locking device for supporting members for a machine, said supporting members being arranged on a chassis or load-bearing frame and being able to be extended, swung out or telescoped from a retracted transport position into an extended working position, said locking device having a locking bolt which is displaceable between a blocking position and an unblocking position in a guide bushing, which is fixed to the chassis or frame and is arranged transversely with respect to the pull-out direction of the supporting member, and is biased in the direction of the blocking position under the influence of a spring, having an actuating member which displaces the locking bolt between the blocking position and the unblocking position, and having an engagement and guiding member for the locking bolt, said engagement and guiding member being arranged rigidly on the supporting member, wherein the engagement and guiding member comprises a cam which pushes the locking bolt into a release position, and wherein, in the release position, the locking bolt is movable automatically into its blocking position.

Mobile machines with crane or boom structures are usually supported on the ground in the working position by means of supporting legs which can be extended or swung out to the side (EP-A 0 357 988). It is important here for the supporting members, which can be extended, for example, by means of hydraulic motors, to be locked in an effective and reliable manner both in their inner transport position and in their supporting position with the aid of the locking device. A locking device of the type mentioned at the beginning is known from DE 42 11 493 A1. Said device has two engagement and guiding members, of which one is situated in each case in the region of the two end positions of the supporting member, i.e. the transport position and the fully extended working position of the supporting member. The locking device is unlocked manually before leaving one of the two end positions of the supporting member. In the process, the locking bolt of the locking device is displaced into a biased unblocking position. If, as a result, one of the engagement and guiding members is passed over, the locking bolt is brought into its release position as a result of the cam of the engagement and guiding member and automatically engages in the blocking position behind the engagement and guiding member. The supporting member is then secured in its position until the next manual unlocking of the locking device. Occasionally, however, the working environment is such that full extension of one or more of the supporting members is not possible, for example when the machine is positioned in the vicinity of a wall or another object. Nevertheless, it is also important in such cases for the supporting members to be brought into a well-defined supporting position, since the reliable pivoting range of a crane or boom is defined by the span.

Based on this, it is the object of the present invention further to develop a device of the type mentioned at the beginning in such a manner that it is also possible to block the displacement path of the supporting member between the end positions in a selective manner.

The combination of features indicated in patent claim 1 is proposed for achieving this object. Advantageous embodiments and further developments of the invention result from the dependent claims.

The invention is based especially on the concept that locking of the supporting member in the partially extended state is sometimes desirable, but not always. Explicit preselection by the operator should take place in this case. According to the invention, this is achieved in that the engagement and guiding member extends between a first engagement position for the locking bolt in the region of the retracted transport position of the supporting member and a second engagement position for the locking bolt in the region of the fully extended, swung-out or telescoped working position of the supporting member, and in that the engagement and guiding member comprises at least one further engagement position between the first and second engagement positions. The locking device can be unblocked manually after leaving the one end position of the supporting member. On reaching the further engagement position, the locking bolt then automatically engages and locks the supporting member in this intermediate position.

If, when the supporting member moves out of an end position, the locking device is not unlocked manually, the supporting member moves as far as the opposite end position where the locking device is automatically released and the supporting member is locked. In order to achieve this, the engagement and guiding member is designed in the region of the end positions in such a manner that the locking device is automatically released in the one displacement direction and not in the other displacement direction. In an advantageous refinement of the invention, for this purpose the engagement and guiding member has a respective pivotable latch in the region of the first and second engagement positions, said latch having the cam which acts on the locking bolt in a first displacement direction of the supporting member and displaces said locking bolt between its unblocking position and the release position. Furthermore, the latch has a stop surface for the locking bolt, by means of which stop surface the latch is pivotable in the second displacement direction of the supporting member out of the displacement path of the supporting member without pushing the locking bolt into its release position. In particular, the latch can have a block portion which projects over the engagement and guiding member in the direction of the locking bolt and on which the cam and the stop surface are arranged.

In a preferred embodiment of the invention, the engagement and guiding member has a rail element with a sliding surface for the locking bolt situated in the release position, wherein the pivotable latches are arranged in recesses in the end regions of the rail element. If the locking device is released manually in order to lock the supporting member in an intermediate position after the supporting member has left an end position, the locking bolt slides on the rail element under the influence of the spring until the further engagement position for the locking bolt, expediently an interruption in the sliding surface, is reached and the locking bolt engages in the engagement position. If more than one further engagement position is provided between the engagement positions on the end sides, it should be noted that the operator releases the locking device (only) before that engagement position which is intended to be taken up. Suitable markings along the rail or on the supporting member indicate where the intermediate engagement positions are situated and make it easier for the operator to select the time for releasing the locking device. Finally, the latch advantageously has a stop hook which strikes against an end surface of the rail element and limits the pivoting angle of the latch to less than 90°. This prevents the latch from being pivoted out of its operative range by the locking bolt or by external influences to an extent such that its function is not ensured temporarily or permanently.

The possibility of locking the supporting member in a partially extended position is supplemented, for safety reasons, by sensor-based monitoring of the actual position of the supporting member, said monitoring being part of an electronic control device for the crane or boom. A control device of this type is known, for example, from EP 2 038 493 B1. This describes an automatic concrete pump having an articulated mast that serves as a support for a supply line and having two forward and two rearward supporting extensions which can be extended from a driving position into a supporting position and can be supported on an underlying surface by one telescopic supporting leg each. In addition, each supporting extension has an inner supporting position close to the chassis and at least one outer supporting position which is remote from the chassis, it being possible to select said supporting positions freely by forming defined supporting configurations for the four supporting extensions. Furthermore, a control device is provided for the movement of the boom arm, said control device having a software routine which responds to the selected supporting configuration and limits the pivoting angle of the first articulated arm about its articulation axis and an associated rotation angle range of the rotatable head about the vertical axis in accordance with the selected supporting configuration. A characteristic of the invention described there is that a selection switch with a plurality of switching positions corresponding to different supporting configurations is provided, and that the control device for the boom arm movement responds to the switching positions of the selection switch. The control device for the boom arm movement also has a software routine or limit switch that responds to the selected supporting configuration and limits the pivoting angle range of the first boom arm about its articulation axis and an associated rotation angle range of the rotatable head about its vertical axis in accordance with the selected supporting configuration. The intermediate engagement positions of the present invention that are detected by means of sensors are advantageously integrated in a control device of this type.

The invention is explained in more detail below with reference to the embodiments which are illustrated in a schematic manner in the drawing, in which.

Figure 2:
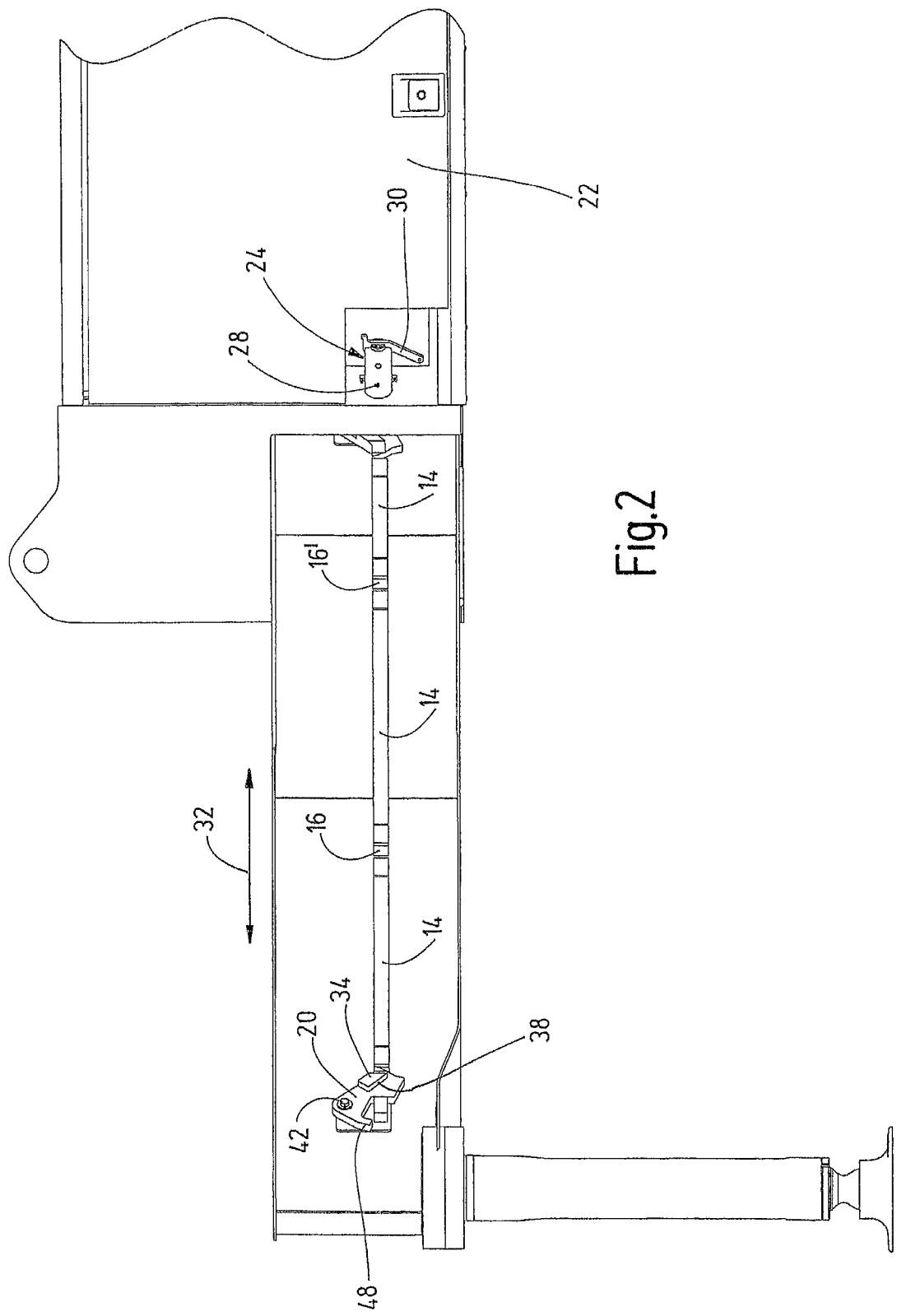
FIG. 2 shows a perspective view of the supporting member according to FIG. 1 in its fully extended position.
Figure 4:
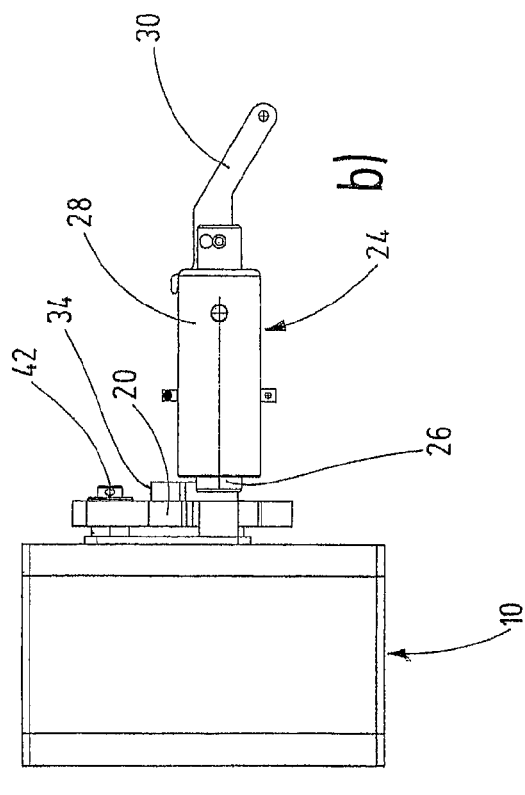
Figure 4:
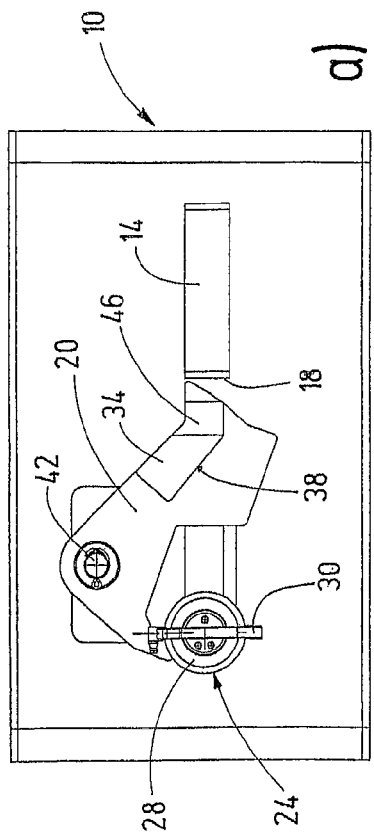
Figure 4:
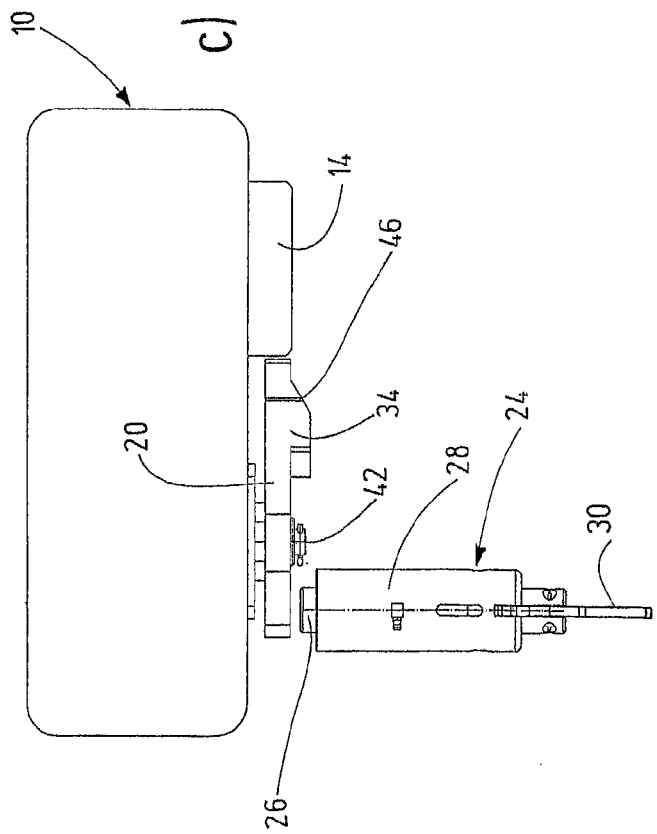
Figure 5:
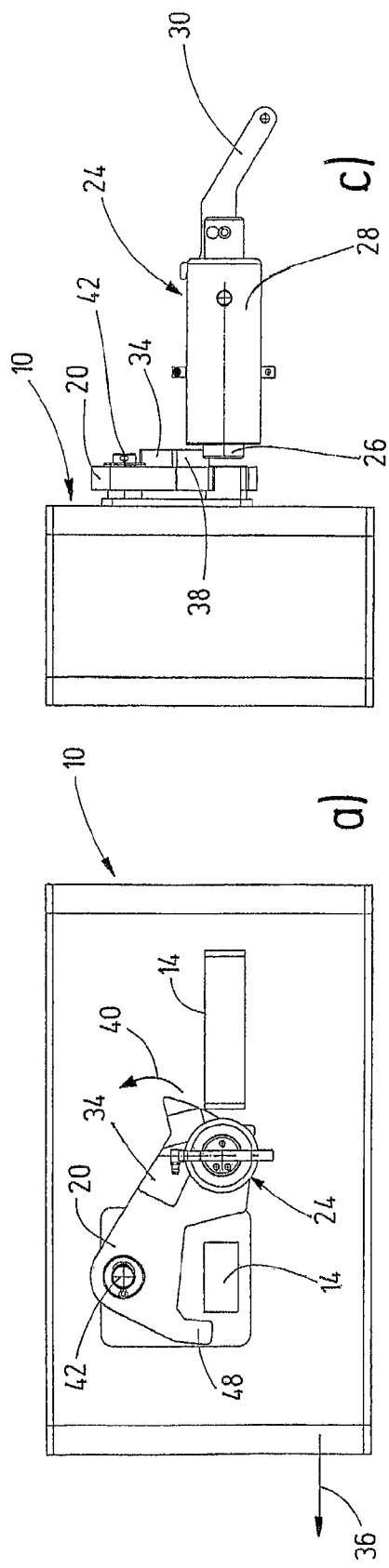
Figure 9:
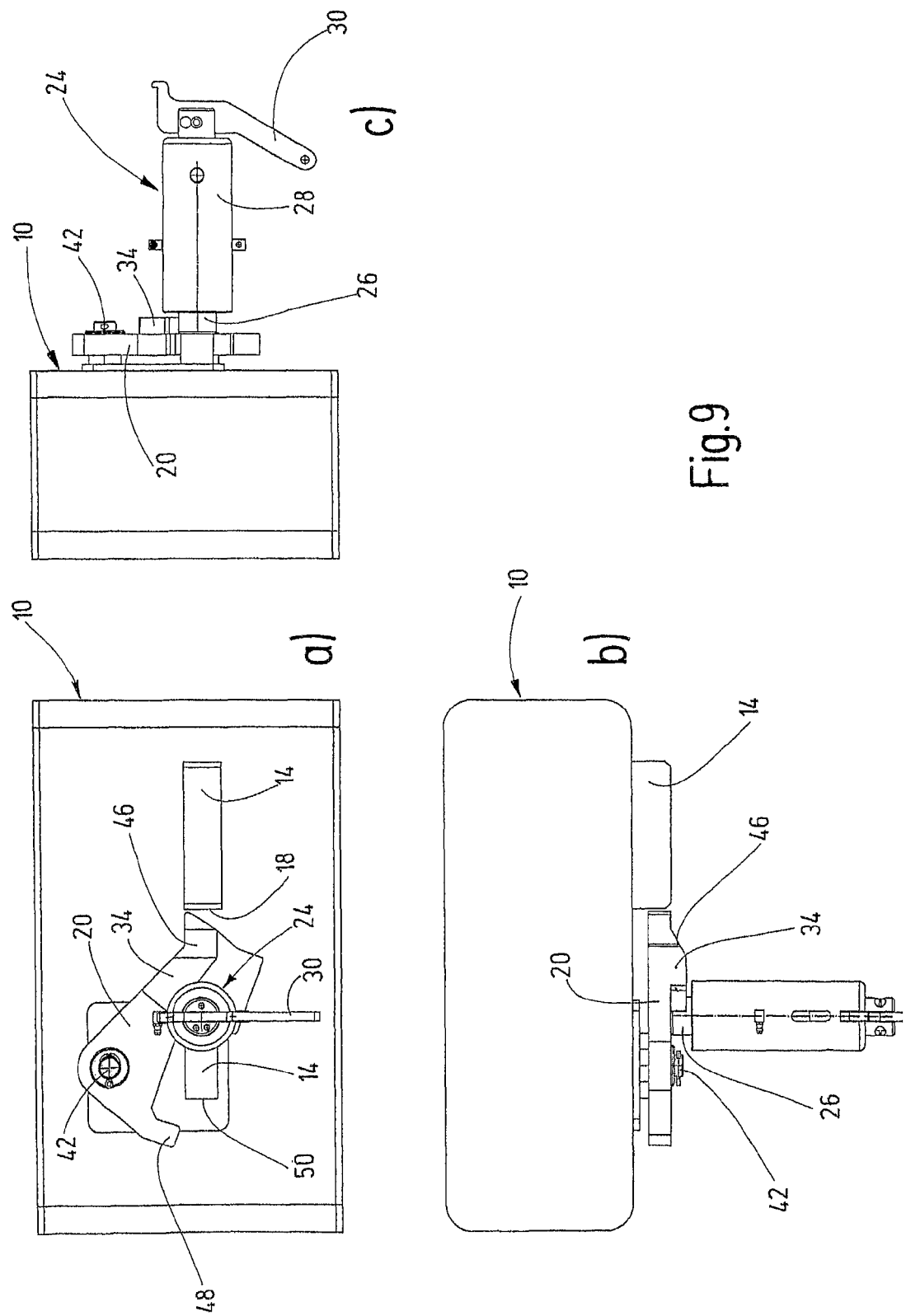
Figure 10:
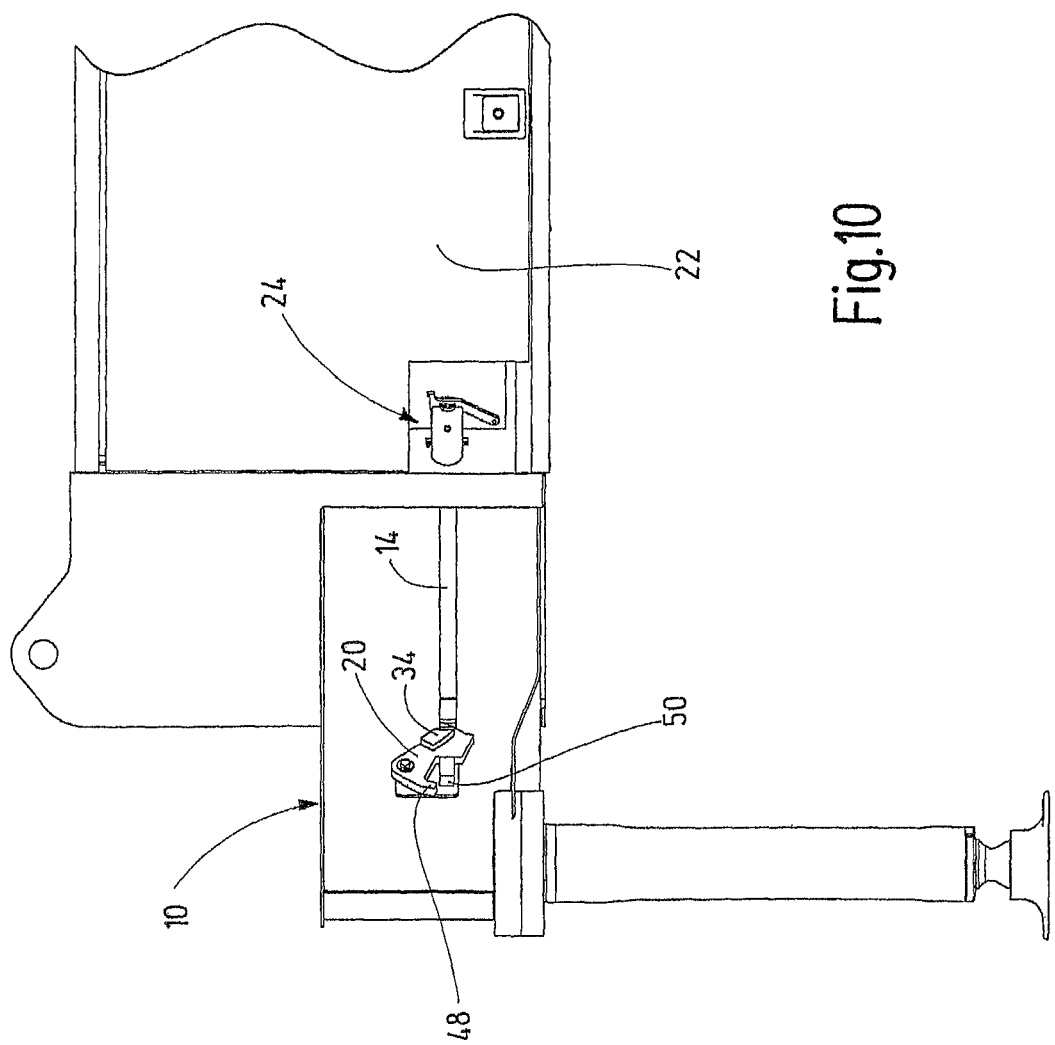

FIGS. 3a to c show a side view, a top view and an end side view of an end region of the engagement and guiding member, with a locking device situated in its blocking position;

FIGS. 4a to c show a side view, a top view and an end side view of an end region of the engagement and guiding member, with a locking device situated in its unblocking position;

FIGS. 5a to c show a side view, a top view and an end side view of an end region of the engagement and guiding member, with a locking device striking against a pivotable latch of the engagement and guiding member;

FIGS. 6a to c show a side view, a top view and an end side view of an end region of the engagement and guiding member, with a locking device situated in its unblocking position after the supporting member has been moved out of its end position;

FIGS. 7a to c show a side view, a top view and an end side view of an end region of the engagement and guiding member, with a locking device which is situated in its unblocking position and strikes against a cam of the latch;

FIGS. 8a to c show a side view, a top view and an end side view of an end region of the engagement and guiding member, with a locking device situated in its release position;

FIGS. 9a to c show a side view, a top view and an end side view of an end region of the engagement and guiding member, with a locking device situated in its blocking position after having traveled over the cam of the latch; and FIG. 10 shows a perspective view according to FIG. 2, wherein the supporting member is locked in an intermediate position.

The device illustrated in the drawing substantially comprises a supporting member 10 which is arranged on a chassis of a machine, such as a mobile concrete pump or the like, so as to be displaceable in relation thereto, and an engagement and guiding member 12 which is arranged on the supporting member and extends between two end positions which can be taken up by the supporting member. The engagement and guiding member 12, for its part, substantially comprises a rail element 14 having interruptions 16, 16' serving as engagement positions, and two pivotably mounted latches 20, 20' which are arranged in the end regions of said rail element and partially engage in recesses 18, 18' of the rail element 14. A locking mechanism 24 having a locking bolt 26 is preferably arranged on a supporting member box 22 (FIG. 2 and FIG. 10), said locking bolt interacting with the engagement and guiding member 12 in such a manner that the supporting member 10 is lockable in end and intermediate positions with respect to the chassis of the machine.

The design and the manner of operating the locking mechanism 24 is described in detail in EP 0 633 847 B1. The locking bolt 26 accordingly has three operating positions: a blocking position, an unblocking position and a release position.

Figure 3:
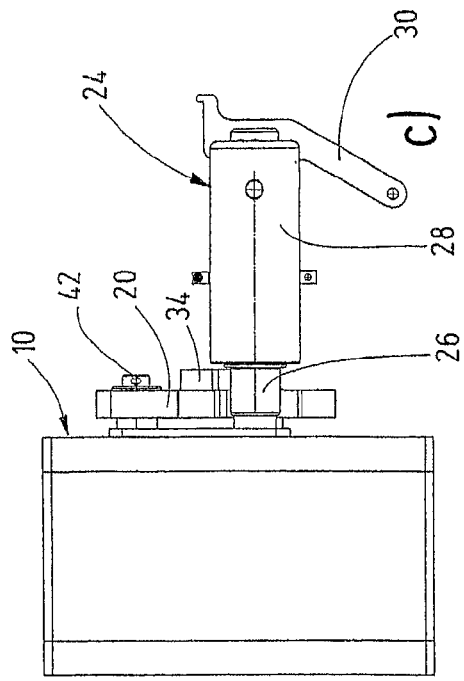
Figure 3:
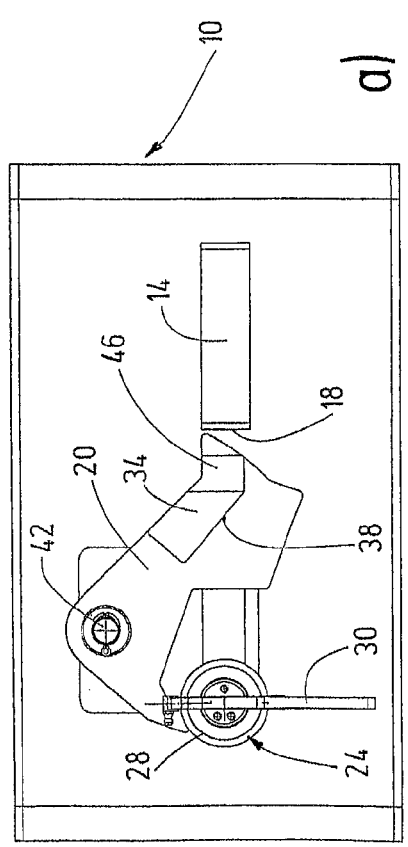
Figure 3:
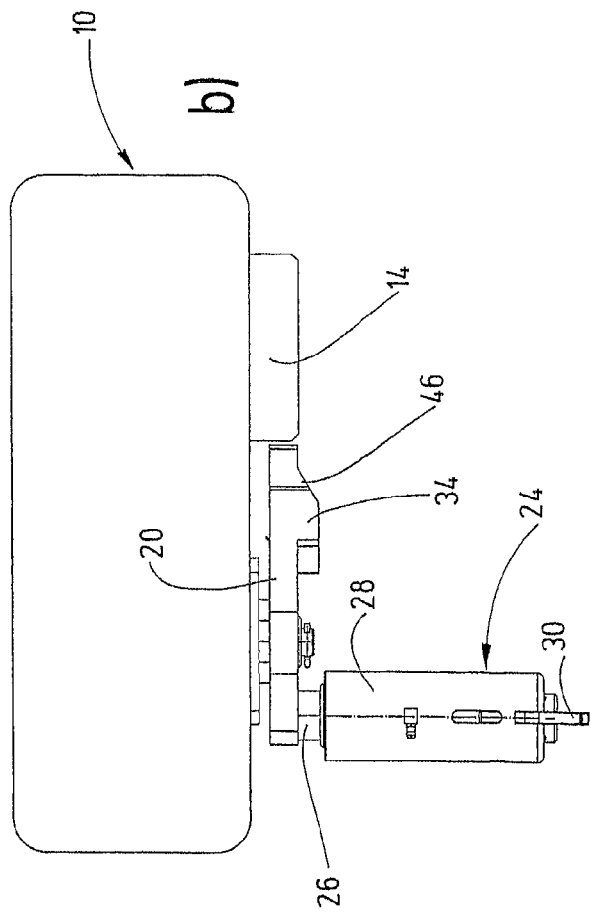

In the blocking position (FIGS. 2, 3, 9 and 10), as a result of the force of a spring which is arranged in the housing 28 of the locking mechanism, the locking bolt 26 is pushed out of said housing. As illustrated in FIGS. 3b and 3c, the locking bolt 26 then forms a stop for the end-side end surface of the rail element 14 (in both end positions of the supporting member) or the end-side boundary surfaces of the interruptions 16, 16' of the rail element (in the two intermediate positions of the supporting member). The supporting member 10 is then blocked in its displacement direction, i.e. is locked with respect to the chassis of the mobile machine.

Figure 1:
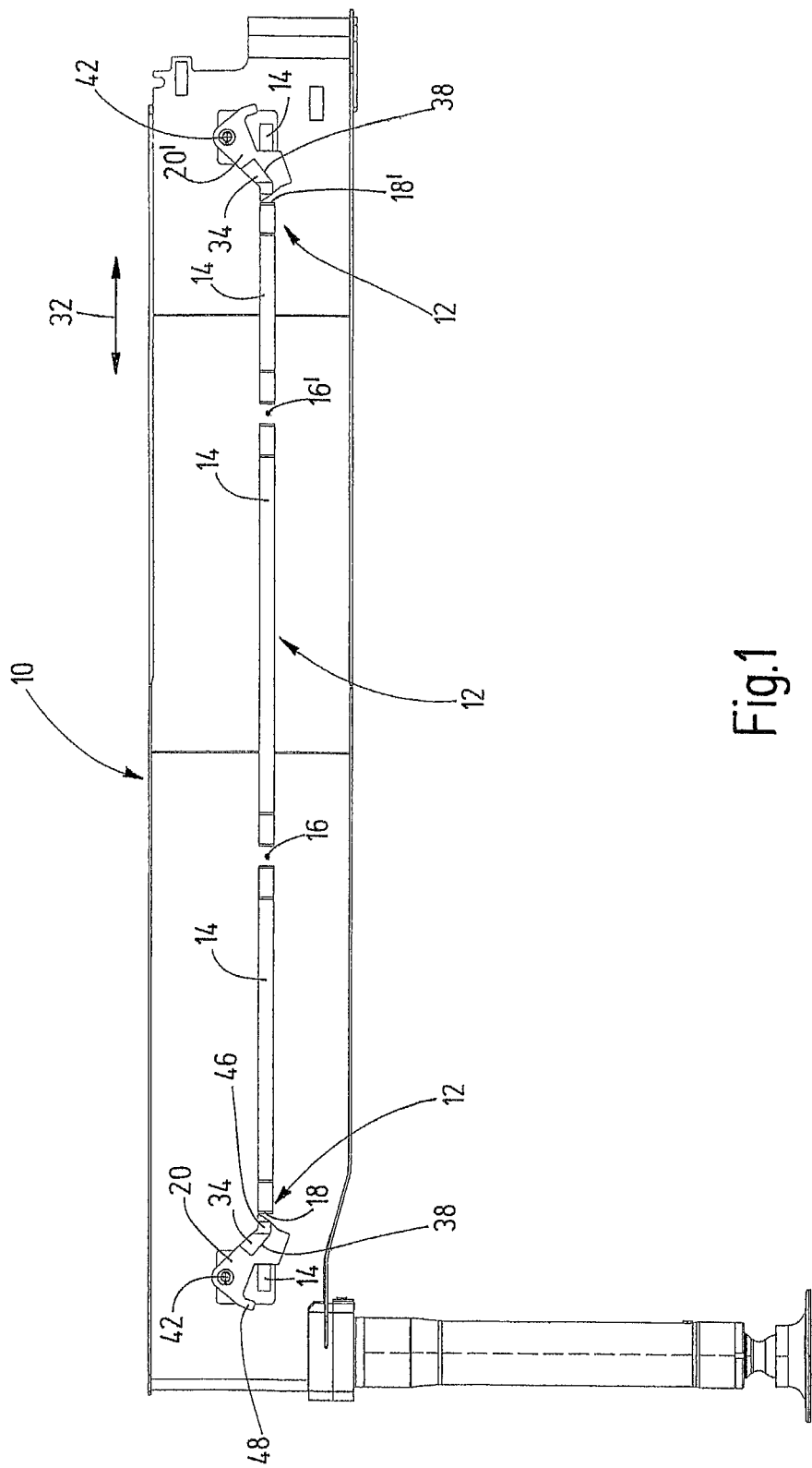
FIG. 1 shows a side view of a supporting member with an engagement and guiding member for a locking device with an end-side engagement position in each case and two engagement positions arranged in between for the locking of the supporting member.

By means of manual actuation of the lever 30 of the locking mechanism 24 by an operator, the locking bolt 26 is displaced counter to the spring force into its unblocking position (FIGS. 4, 5, 6), in which the locking bolt is pushed into the housing 28 and is secured in said position, i.e. the locking bolt 26 remains in this position without any external influence despite the influence of the spring force. The rail element 14 of the engagement and guiding member 12 is released in said position of the locking bolt 26, and the supporting member can be moved in both displacement directions (double arrow 32 in FIGS. 1 and 2). However, the latch 20 has a block portion 34 which projects over the rail element and in relation to which the locking bolt 26 does not have room to move freely. In the displacement direction of the supporting member 10 that is indicated by the arrow 36 in FIG. 5, the locking bolt 26 strikes against an oblique stop surface 38 of the block portion 34, as a result of which the latch is raised and is pivoted about its fastening axis 42 in the direction of the arrow 40, specifically until the block portion 34 has been pivoted out of the path of the locking bolt 26 and the latter can pass the latch. There is no action of force here on the locking bolt in respect of its operating position, i.e. said locking bolt remains in the unblocking position.

Figure 6:
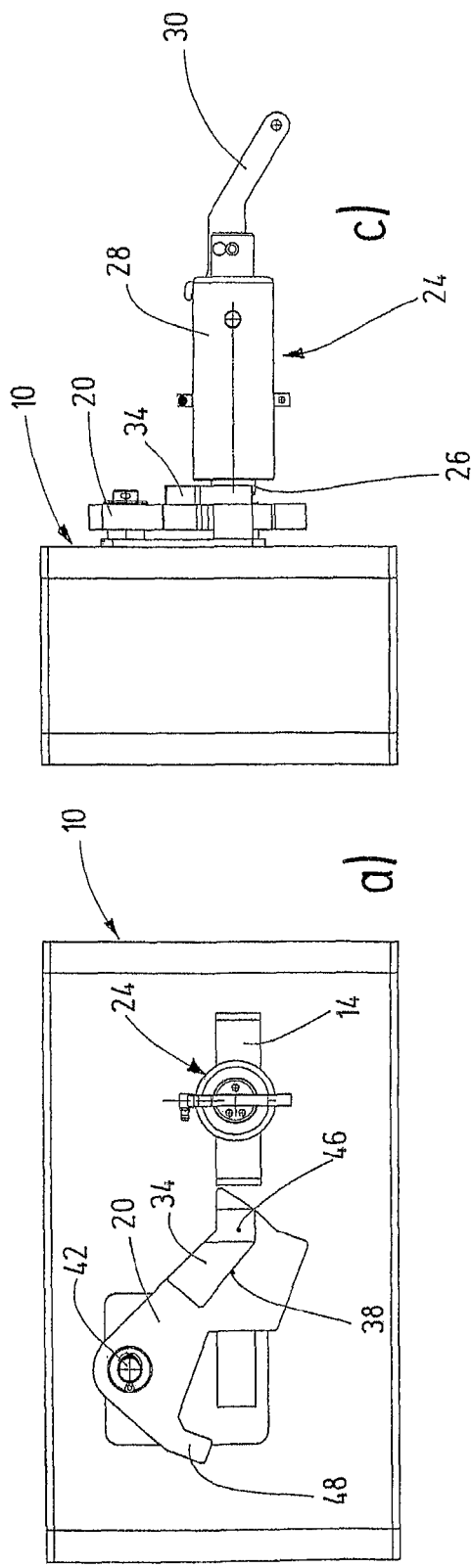

The supporting member is now situated in the relative position illustrated in FIG. 6 with respect to the locking mechanism 24. The operator then has the choice to fully extend the supporting member 10 or to bring about locking in an intermediate position.

In the case last mentioned, a manual actuation of the locking mechanism 24 is required, by means of which the locking bolt 26 is brought out of the unblocking position into the blocking position. The locking bolt 26, which is partially pushed out of the housing 28, then bears under the influence of the spring force against that surface of the rail element 14 which faces it. The rail element 14 slides under the locking bolt 26 as far as the interruption 16 or 16' (depending on in which extension position of the supporting member 10 the operator has actuated the locking mechanism 24). As soon as the locking bolt 26 is aligned with the interruption 16 or 16', the locking bolt is displaced by the spring into its blocking position, which is pushed completely out of the housing 28, and engages in the interruption 16 or 16'. By this means, the supporting member 10 is locked in this position, as illustrated in FIG. 10.

If the supporting member 10 is intended to be fully extended, the operator refrains from manually actuating the locking mechanism 24. An automatic actuation of the locking mechanism 24 takes place by means of the latch 20', said actuation being able to be explained with reference to FIGS. 7 to 9. To this end, it should be noted that the latches 20, 20' are formed mirror-symmetrically with respect to each other and the figures illustrate merely that region of the engagement and guiding member 12 which has the latch 20. However, the automatic release of the locking mechanism 24 takes place according to the same principle.

Figure 7:
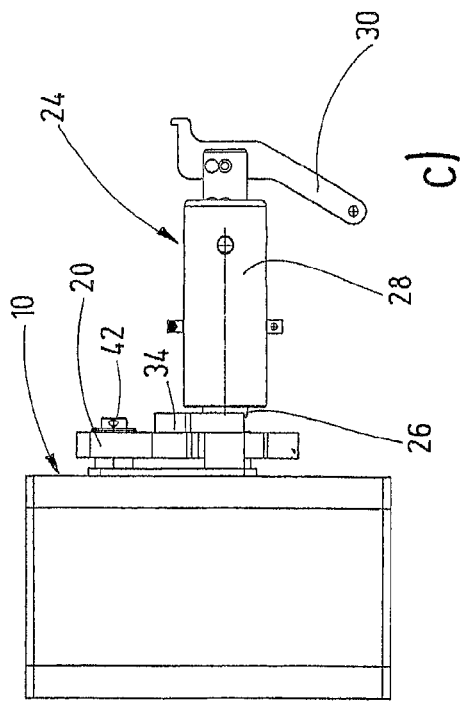
Figure 7:
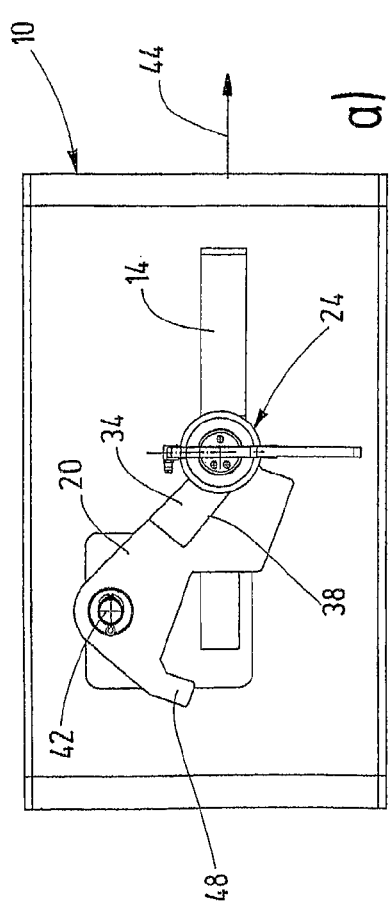
Figure 7:
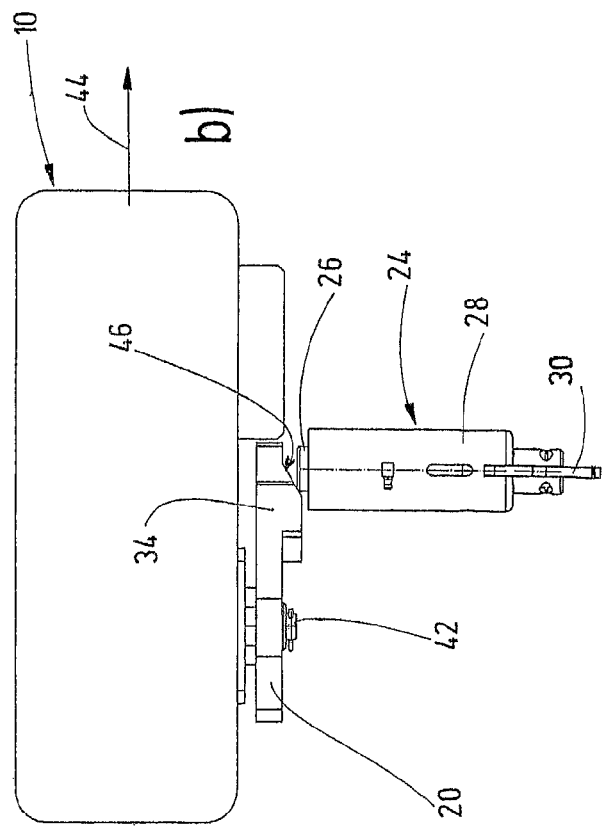
Figure 8:
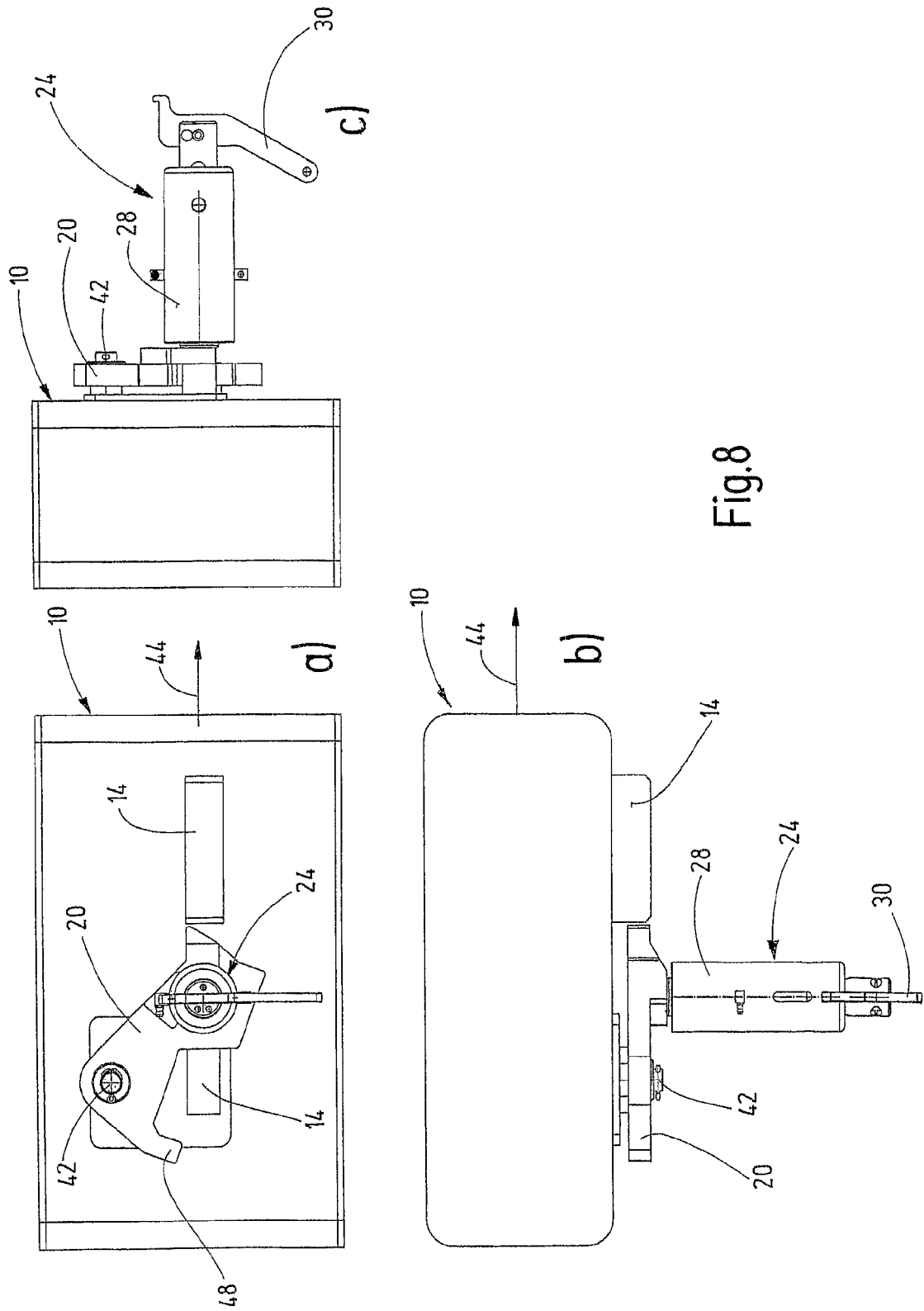

In FIG. 7, the supporting member now moves in the direction of the arrow 44. The locking bolt 26 strikes against an oblique guiding surface 46 of the block portion 34 of the latch 20. In said displacement direction of the supporting member 10, the locking bolt is not capable of pivoting the latch 20 out of the displacement path because of the geometrical configuration and mounting of said latch. On the contrary, the locking bolt 26 is pushed from the unblocking position along the guiding surface 46 further into the housing 28 into its release position (FIG. 8). The locking bolt 26 is pushed out of said release position into its blocking position by the spring arranged in the housing 28 of the locking mechanism 24. This takes place as soon as the obstacle formed by the block portion 34 of the latch 20 has been overcome (FIG. 9). The locking bolt 26 then first of all strikes against the end-side region of the rail element 14 and slides on the latter until the end of said rail element is reached. The locking bolt 26 is then pushed out of the housing 28 into its blocking position by the spring and the configuration which is illustrated in FIG. 3 and in which the supporting member 10 is locked in its end position is reached again.

In order to prevent the latch 20, 20' from being pivoted out of its recess 18, 18' in the rail element 14 by means of the locking bolt 26 or by means of external influences and therefore no longer being able to act in the blocking position on the locking mechanism, the latch has a stop hook 48 which strikes against the free end side 50 of the rail element and limits the pivoting angle of the latch to below 90°. The latch 20, 20' is then always capable of taking up its operative position because of the influence of gravity.

Only the mechanical components of the device are described in the above-described drawing. However, over and above this, electronic components, such as position sensors, are provided for the supporting member 10 and the locking device, said electronic components being incorporated into a control system of the machine and ensuring that a permissible pivoting range of a crane or boom is not exceeded even when the supporting members are only partially extended.

In summary, the following should be noted: the invention relates to a locking device for supporting members 10 for a machine, said supporting members being arranged on a chassis or load-bearing frame and being able to be extended, swung out or telescoped from a retracted transport position into an extended working position, said locking device having a locking bolt 26 which is displaceable between a blocking position and an unblocking position in a guide bushing, which is fixed to the chassis or frame and is arranged transversely with respect to the pull-out direction of the supporting member 10, and is biased in the direction of the blocking position under the influence of a spring, having an actuating member 30 which displaces the locking bolt 26 between the blocking position and the unblocking position, and having an engagement and guiding member 12 for the locking bolt, said engagement and guiding member being arranged rigidly on the supporting member 10, wherein the engagement and guiding member 12 comprises a cam 46 which pushes the locking bolt 26 into a release position, and wherein, in the release position, the locking bolt 26 is movable automatically into its blocking position. In order to be able to undertake locking of the supporting members in defined positions in restricted space conditions and with the supporting members only partially extended, it is proposed according to the invention that the engagement and guiding member 12 extends between a first engagement position for the locking bolt 26 in the region of the retracted transport position of the supporting member 10 and a second engagement position for the locking bolt 26 in the region of the fully extended, swung-out or telescoped working position of the supporting member 10, and that the engagement and guiding member 12 comprises at least one further engagement position 16, 16' between the first and second engagement positions.

The invention claimed is:

1. A machine comprising:
   a chassis or load-bearing frame having a support member being able to be extended, swung out or telescoped from a retracted transport position into an extended working position,
   a guide bushing,
   a locking device having a spring, an actuating member, and a locking bolt displaceable between a blocking position and an unblocking position in the guide bushing, wherein the locking device is fixed to the chassis or frame and is arranged transversely with respect to a pull-out direction of the support member, wherein the locking bolt is biased in a direction of the blocking position by the spring, wherein the actuating member displaces the locking bolt between the blocking position and the unblocking position, and
   an engagement and guiding member for the locking bolt, said engagement and guiding member being arranged rigidly on the support member (10), wherein the engagement and guiding member comprises pivotable first and second latches having first and second cams, respectively, for pushing the locking bolt into a release position, and wherein, in the release position, the locking bolt is movable automatically into the blocking position, wherein the engagement and guiding member extends between a first engagement position for the locking bolt in a region of the retracted transport position of the support member and a second engagement position for the locking bolt in a region of the extended working position of the support member, wherein the engagement and guiding member comprises at least one further engagement position between the first and second engagement positions, and wherein the first and second latches are in respective regions of the first and second engagement positions, respectively, wherein each of said first and second cams respectively acts on the locking bolt in a first displacement direction of the support member and displaces said locking bolt between the unblocking position and the release position.

2. The device as claimed in claim 1, wherein each of the first and second latches has a respective stop surface for the locking bolt, wherein via the stop surface the respective latch is pivotable in a second displacement direction of the support member out of a displacement path of the support member without pushing the locking bolt into the release position.

3. The device as claimed in claim 2, wherein each of the first and second latches has a respective block portion projecting over the engagement and guiding member in a direction of the locking bolt, wherein the respective cam and the respective stop surface are arranged on the respective block portion.

4. The device as claimed in claim 1, wherein the engagement and guiding member has a rail element with a sliding surface for the locking bolt situated in the release position.

5. The device as claimed in claim 4, wherein the at least one further engagement position for the locking bolt is formed by an interruption in the rail element.

6. The device as claimed in claim 1, wherein each of the first and second latches has a respective stop hook striking against a respective end surface of the rail element and limits a pivoting angle of the respective latch to less than 90°.

* * * * *